United States Patent [19]

Ooga

[11] Patent Number: 4,596,535
[45] Date of Patent: Jun. 24, 1986

[54] FRICTION MECHANISM IN A DAMPER DISC

[75] Inventor: Syougo Ooga, Osaka, Japan

[73] Assignee: Kabushiki Kaisha Daikin Seisakusho, Neyagawa, Japan

[21] Appl. No.: 708,825

[22] Filed: Mar. 6, 1985

[30] Foreign Application Priority Data

Mar. 9, 1984 [JP] Japan .................................. 59-46216

[51] Int. Cl.$^4$ ............................................... F16D 3/14
[52] U.S. Cl. ..................................... 464/68; 192/106.2
[58] Field of Search ........................... 192/106.1, 106.2; 464/66, 68, 64

[56] References Cited

U.S. PATENT DOCUMENTS

| | | | |
|---|---|---|---|
| 3,931,876 | 1/1976 | Beeskow et al. | 192/106.2 |
| 4,144,959 | 3/1979 | Maucher et al. | 192/106.2 |
| 4,212,380 | 7/1980 | Billet | 192/106.2 |
| 4,222,476 | 9/1980 | LeBrise | 192/106.2 |
| 4,433,770 | 2/1984 | Loizeau et al. | 192/106.2 |
| 4,478,326 | 10/1984 | Rotter | 464/68 X |

Primary Examiner—Stuart S. Levy
Assistant Examiner—Daniel P. Stodola
Attorney, Agent, or Firm—Burns, Doane, Swecker & Mathis

[57] ABSTRACT

A friction mechanism in a damper disc has a cylindrical hub adapted to connect to an output device and having a radial flange. A pair of side plates are connected to an input member and disposed at respective sides of the flange. A sub-plate is disposed between the side plate and the flange. A torsion spring twistably connects the flange and the side plates together. The mechanism includes a first friction device for a first torsion operation; and a second friction device for a second torsion operation. The sub-plates are adapted to torsionally turn with respect to one of the flange and the side plates in a first torsion operation and to torsionally turn with respect to the other of the flange and the side plates in a second torsion operation. The first and second friction devices are radially shifted to each other and are disposed independently of each other.

5 Claims, 7 Drawing Figures

U.S. Patent   Jun. 24, 1986   Sheet 1 of 3   4,596,535
FIG. 1 PRIOR ART
FIG. 2 PRIOR ART
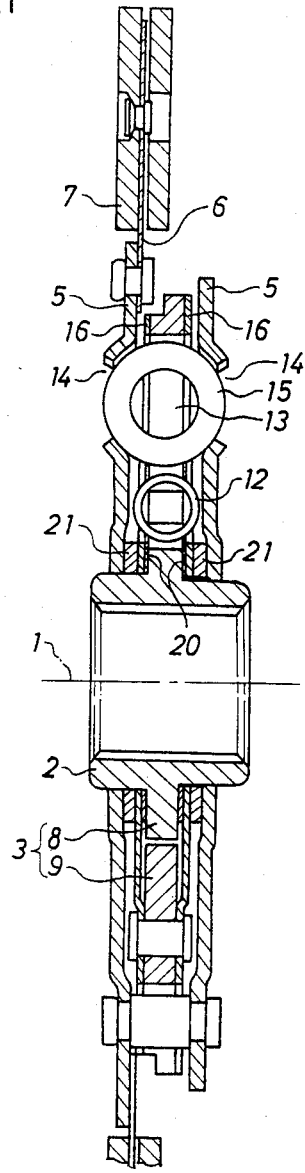
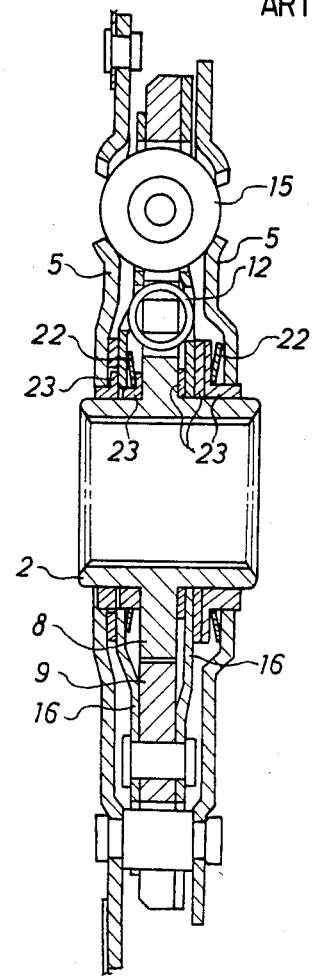

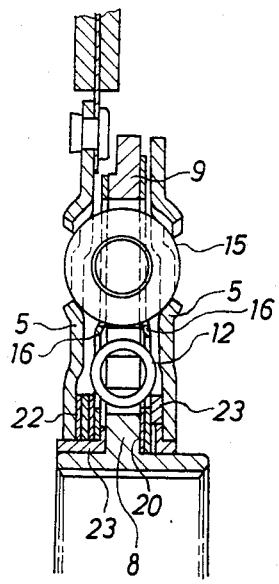
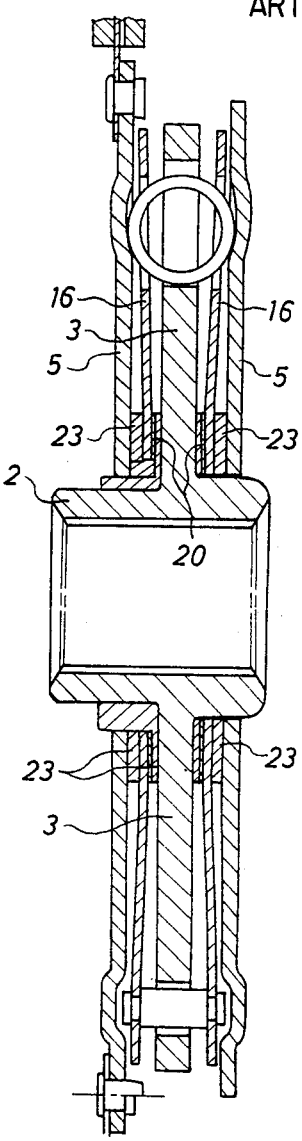
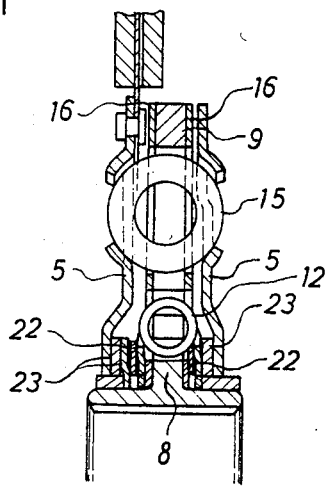

FRICTION MECHANISM IN A DAMPER DISC

BACKGROUND AND SUMMARY OF THE INVENTION

The present invention relates to a damper disc employed in a friction clutch for an automobile and others, and more particularly, to a friction mechanism in such a damper disc.

In order to improve a torsion angle and others of a disc, the applicant has already developed a disc as shown in FIG. 1 in a Japanese Patent Application No. 56-20510 (Laid-open publication No. 57-134019). Referring to FIG. 1, which is a sectional view, a hub 2 splined to an output shaft 1 (only a center line thereof is illustrated) is provided with radial flange part 3. A pair of side plates 5 and disposed at respective sides of the flange part 3. A friction facing 7 is connected through cushioning plates 6 to one of the side plates 5. The flange part 3 is divided into a radially inner flange 8 and a radially outer flange 9. The outer flange 9 engages with the outer periphery of the inner flange 8 and is connected to the flange 8 through a weak spring 12 so that both flanges 8 and 9 may be twistable with respect to each other. The flange 9 and the side plates 5 have openings 13 and 14, respectively, in which torsion springs 15 are disposed for twistably connecting the side plates 5 and the flange 9 together.

Sub-plate 16 are fixed at respective surfaces of the flange 9. Radially inner portions of the sub-plates 16 are extended to both sides of the inner flange 8 to hold the spring 12. Wave springs 20 are interposed between the inner peripheral portions of the sub-plates 16 and the flange 8. Friction washers 21 are interposed between the sub-plates 16 and the side plates 5, respectively.

In the above disc, a torque transmitted from the facing 7 to the side plates 5 is transmitted through the springs 15, flange 9 and spring 12 to the flange 8, hub 2 and output shaft 1. In this operation, while the torque is small, which is a first torsion operation, the flange 9 is untwistably connected to the side plates 5 and twists or torsionally turns with respect to the flange 8 while compressing the spring 12. When the torque increases over a predetermined value, which is a second torsion operation, the flange 9 is untwistably connected to the flange 8, and the side plates 5 twist or torsionally turn with respect to the flanges 8 and 9. In accordance with this twisting operation, sliding occurs on the surfaces of the springs 20 and the washers 21, so that hysteresis torque is generated in the damping characteristic by frictional forces corresponding to above sliding. The sliding on the wave springs 20 occurs in the first torsion operation, and the sliding on the friction washers 21 occurs in the second torsion operation. Therefore, the frictional forces on the wave springs 20 and on the friction washers 21 are generally determined to be different to each other, so that the hysteresis torque may change in two steps for effectively absorbing torque vibration throughout the torsion area.

However, in above known structure, all of the friction members, which are the springs 20 and washers 21, are disposed to axially overlap each other with the flange 8 and sub-plates 16 therebetween. Therefore, when the friction washers 21 are worn and become thin after a long use, the springs 20 axially extend, so that the pressure between the springs 20, flange 8 and the sub-plates 16 decreases. As a result the biasing force of the springs 20 against the washers 21 as well as the pressure on the washers 21 also decreases. Consequently, the frictional forces on the springs 20 and the washers 21 change and the hysteresis torque becomes unstable. Thus, the intended absorbing effect for the torque vibration can not be obtained.

The above problem is caused not only in the friction mechanism in FIG. 1 including the springs 20 and the washers 21 but also in the mechanisms in FIGS. 2 to 5.

In the mechanism in FIG. 2, a conical spring 22 and two friction members 23 (such as a friction washer and a friction plate) are interposed between the right (in FIG. 2) side plates 5 and the sub-plate 16. A conical spring 22 is also interposed between the left sub-plate 16 and the flange 8. In the mechanism in FIG. 3, a wave spring 20 and a conical spring 22 are used as spring means. In the mechanism in FIG. 4, a conical spring 22 is interposed together with a friction members 23 between the left side plate 5 and the sub-plate 16, and a conical spring 22 is interposed also between the right sub-plate 16 and the flange 8. In the disc in FIG. 5, a flange part 3 is not divided and has an integral structure, and wave springs 20 are disposed at respective sides of the flange part 3.

In the discs in FIGS. 2 to 5, all of the frictional members (20, 22, 23) are disposed to axially overlap each other. Therefore, they have same problem as that in FIG. 1.

Accordingly, it is an object of the invention to provide an improved structure, overcoming the above-noted problems, wherein a first friction means for a first torsion operation and a second friction means for a second torsion operation are disposed independently of each other.

According to the invention, a friction mechanism in a damper disc comprises a cylindrical hub adapted to connect to an output means and having a radial flange; a pair of side plates connected to an input member and disposed at respective sides of the flange; a sub-plate disposed between the side plate and the flange; a torsion spring twistably connecting the flange and the side plates together; a first friction device for a first torsion operation; and a second friction device for a second torsion operation; said sub-plates being adapted to torsionally turn with respect to one of the flange and the side plates in a first torsion operation and to torsionally turn with respect to the other of the flange and the side plates in a second torsion operation; and said first and second friction devices are radially shifted to each other and are disposed independently of each other.

Other and further objects, features and advantages of the invention will appear more fully from the following description of the preferred embodiments of the invention.

BRIEF DESCRIPTION OF THE DRAWINGS

FIGS. 1 to 5 are fragmentary sectional views of respectively different conventional discs to which the present invention can be applied;

DETAILED DESCRIPTION OF THE PREFERRED EMBODIMENTS

Figure 6:
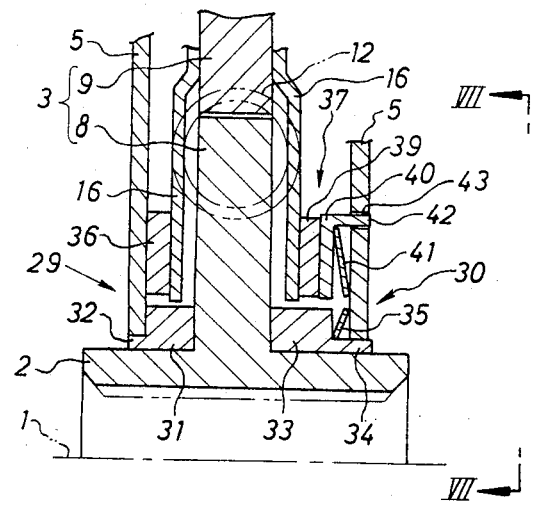
FIG. 6 is a fragmentary sectional view of an embodiment of the invention.

Referring to FIG. 6, same members and parts as those in FIG. 5 and 6 bear same reference numerals. In FIG.

6, first friction devices 29 and 30 are interposed between an inner peripheral portion of a flange 8 and a pair of side plates 5. The first friction device 29, positioned on the left in FIG. 6, consists of only an annular friction plate 31. The friction plates 31 is disposed between an inner periphery of a sub-plate 16 and an outer periphery of a hub 2, and is pressed against the inner peripheral portions of the side plate 5 and the flange 8. The plate 31 is provided at one end with a cylindrical projection 32 which engages with the inner periphery of the side plate 5. The other first friction device 30 consists of an annular friction plate 33 and a conical spring 35. The friction plate 33 is disposed between the inner periphery of other sub-plate 16 and the outer periphery of the hub 2, and is pressed against the inner peripheral portion of the flange 8. The friction plate 33 is provided at one end with a cylindrical projection 34 which engages with the inner periphery of the side plate 5. The conical spring 35 is disposed around the cylindrical projection 34 and between the side plate 5 and the body of the friction plate 33. In the illustrated embodiment, the conical spring 35 is pressed at the inner periphery thereof against the body of the friction plate 33 and is pressed at the outer periphery thereof against the side plate 5. In order to dispose the first friction devices 29 and 30 as described above, a pair of sub-plates 16 are interposed between the flange 2 and the side plates 5 which have smaller inner diameters than the sub-plates 16.

Figure 7:
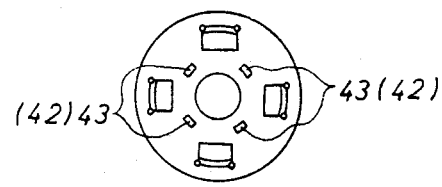
FIG. 7 is a schematic elevational view taken along line VII—VII in FIG. 6.

A second friction device 36 is disposed radially outside the first friction device 29, and another second friction device 37 is disposed radially outside the first friction device 30. The second friction device 36 consists of only an annular friction washer which is compressed by and interposed between the inner peripheral portion of the sub-plate 16 and the side plate 5. The second friction device 37 consists of an annular friction washer or member 39, an annular friction plate 40 and an annular conical spring 41. The washer 39 is pressed against the inner peripheral portion of the adjacent sub-plate 16. The annular friction plate 40 is pressed against the washer 39 from the opposite side to the sub-plate 16. The conical spring 41 is compressively interposed between the friction plate 40 and the side plate 5. The inner periphery of the spring 41 is pressed against the side plate 5, and the outer periphery thereof is pressed against the friction plate 40. The friction plate 40 is provided at the outer periphery with bent projections 42 for preventing the rotation of the plate 40 relative to the side plate 5. The projections 42 extend radially outside the conical spring 41 and fit into apertures 43 in the side plate 5. As shown in FIG. 7, The projections 42 and the apertures 43 are spaced in the circumferential direction of the disc and are four in number, respectively.

An operation is as follows. According to the disc in FIG. 6, similarly to that in FIG. 1, the flange 9 twists together with the side plates 5 with respect to the flange 8 in the first torsion operation in which a torsion angle is small. In the second torsion operation in which the torsion angle is large, the flange 9 is rigidly connected to the flange 8 and the side plates 5 twist with respect to the flanges 8 and 9.

In the above first torsion operation, since the side plates 5 turn relatively to the flange 8, a sliding occurs on the surfaces of the first friction devices 29 and 30, e.g., on the pressed surfaces of the flange 8 and the plates 31 and 33. The frictional force occurring during this sliding causes a first hysteresis torque. In the first torsion operation, since the flange 9 and the sub-plates 16 are integrally connected to the side plates 5, sliding does not occur on the second friction devices 36 and 37.

In the second torsion operation, since the sub-plates 16 and the flange 9 are rigidly connected to the flange 8 and the side plates 5 twist relatively to the flange 9 and the sub-plates 16, sliding occurs on the surfaces of the second friction devices 36 and 37. In this operation, the sliding occurs on the pressed surfaces of the washer 39 and the friction plate 40 or the pressed surfaces of the washer 39 and the sub-plate 16, because the friction plate 40 is connected to the side plate 5 by the projections 42 and turns together with the side plate 5. In the second torsion operation, the sliding occurs also on the surfaces of the first friction devices 29 and 30. The frictional force corresponding to this sliding causes a large second hysteresis torque in the second torsion characteristic.

After a long use of the disc, the plates 31 and 33 may be worn and become thin. However, even in that case, the axial distances between the sub-plates 16 and the side plates 5 do not substantially change. Therefore, the conical spring 41 does not substantially extend in the axial direction, and thus, the pressures and frictional forces on the second friction devices 36 and 37 do not largely change.

When the washer 39 is worn, the wear thereof does not largely affect the conical spring 35. Therefore, the hysteresis torque by the first friction devices 29 and 30 can be stable for a long time.

According to the invention, as stated hereinbefore, since the first friction devices 29, 30 and the second friction devices 36 and 37 are radially displaced from each other and are disposed independently of each other, the wear of the first friction devices 29, 30 and the wear of the second friction devices 36, 37 do not largely affect other friction devices. Therefore, the first and the second hysteresis torque can be stable for a long time, respectively, resulting in improvement of the durability of the friction devices.

The present invention may be modified as follows. The second friction device 36 may be constructed similarly to other second friction device 37. Wave springs may be used instead of the conical spring. Of course, the present invention may be applied to any of the discs in FIGS. 1 to 5. When employing the present invention in the disc in FIG. 5, a friction device may be disposed between the flange part 3 and the sub-plates 16 and other friction device may be disposed radially inside the sub-plate 16 and between the flange part 3 and the side plates 5. The present invention may be applied in such a disc that the subplates are adapted to twist relatively to the side plates in a first torsion operation and to twist in a second torsion operation relatively to a flange (i.e., inner flange or an integral flange as shown in FIG. 5).

Although the invention has been described in its preferred form with a certain degree of particularity, it is understood that the present disclosure of the preferred form may been changed in the details of construction and the combination and arrangement of parts may be resorted to without departing from the spirit and scope of the invention as hereinafter claimed.

What is claimed is:
1. A friction mechanism in a damper disc comprising:
 a cylindrical hub adapted to connect to an output means and having an outer periphery with a first diameter and a radial flange;

a pair of side plates connected to an input member and disposed at respective sides of the flange;

a pair of sub-plates, each sub-plate disposed between the corresponding side plate and the flange and having an inner periphery with a second diameter, the second diameter being greater than the first diameter so that the side plates extend radially inwardly beyond the inner periphery of the sub-plates;

a torsion spring twistably connecting the flange and the side plates together;

a first friction device assembled in the disc for a first torsion operation, said first friction device being interposed between the inner periphery of the sub-plate and the outer periphery of the hub and between the side plate and the flange;

a second friction device assembled in the disc for a second torsion operation, the second friction device being disposed axially beside the sub-plate and radially around the outside the first friction device;

said sub-plates being adapted to torsionally turn with respect to one of the flange and the side plates in a first torsion operation and to torsionally turn with respect to the other of the flange and the side plates in a second torsion operation;

said first and second friction devices being radially displaced relative to each other and being independently operable of each other.

2. A friction mechanism in a damper disc of claim 1 wherein said first friction device has an end provided with a cylindrical projection fitted between the inner periphery of the side plate and the outer periphery of the hub.

3. A friction mechanism in a damper disc of claim 1 wherein said first friction device includes an annular spring seated directly on the side plate and adapted to press the first friction device against the flange, and said second friction device includes an annular spring seated directly on the side plate and adapted to press the second friction device against the subplate.

4. A friction mechanism in a damper disc of claim 1 wherein said second friction device includes:
- a member which is slidably and directly pressed against the sub-plate,
- an annular spring seated on the side plate, and
- an intermediate member unrotatably connected to the side plate and disposed between the member and the annular spring.

5. The friction mechanism in a damper disc of claim 4 wherein said intermediate member includes a plurality of generally axially extending projections; wherein one of said side plates includes a corresponding plurality of axial recesses to slidably receive the axially extending projections so as to unrotatably connect the side plate and the slide member.

* * * * *